Jan. 10, 1961  J. ROSENBERGER ET AL  2,967,550
TIGHTENING AND CUTTING DEVICE FOR HOOPING OBJECTS
Filed Dec. 17, 1954  2 Sheets-Sheet 1

JAKOB ROSENBERGER
OTTO JAKOB
INVENTORS

INVENTORS
JAKOB ROSENBERGER
BY  OTTO JAKOB

United States Patent Office 2,967,550
Patented Jan. 10, 1961

2,967,550

TIGHTENING AND CUTTING DEVICE FOR HOOPING OBJECTS

Jakob Rosenberger and Otto Jakob, Zurich, Switzerland, assignors to Erich Borbe, Zurich, Switzerland Filed Dec. 17, 1954, Ser. No. 475,976

Claims priority, application Switzerland Dec. 29, 1953

5 Claims. (Cl. 140—93)

The present invention relates to a device designed to tighten and cut hoop irons in band and like form on objects of any given shape, in particular objects which do not have a suitable or sturdy supporting surface for the application of a tightening and cutting device.

Tightening and cutting devices of the type indicated are known and operate in conjunction with a clamping sleeve attached on a loop at the end of one hoop through which sleeve the hoop portion employed for the purpose is slid for tightening purpose. The tightening and cutting device serves to tighten the hoop end which projects from the clamping sleeve relative to the said sleeve, further to lock the tightened hoop by bending the same over, and finally to sever the hoop end after locking. While this hooping method has proved to be suitable, the tightening and cutting devices so far known and employed display certain defects considered as undesirable in operation. The principal disadvantage resides in the fact, that a separate movable lever is provided for the tightening operation and the subsequent cutting operation, so that the device consists of the actual tightening frame and two pincer or scissor action levers hingedly attached to the said frame. This design renders operation of the device complicated. Moreover, insertion of the hoop in the device is usually difficult since the members serving to tighten the hoop normally extend into the hoop channel thus obstructing the same to a greater or lesser extent.

The present invention has for its object the elimination of the said disadvantages and relates to a tightening and cutting device for hoop iron employing a clamping sleeve held in position by bending over one hoop end, against which sleeve the rhamphoid front end of the device rests when the hoop is tightened, and around which the device together with the tightened hoop is thrown on completion of the tightening operation. The tightened hoop is then severed by the device in the thrown-back position. The invention is characterized by the fact that the device comprises a tightening frame with a handle and only one operating lever rotatably arranged on the said frame which operating lever extends in the direction opposite that of the frame handle when in idle or inoperative position. In this position a hoop locking pawl and a hoop tightening pawl are raised to leave the hoop channel unobstructed for free insertion of the hoop. When this operating lever is swivelled by approximately 180° from its idle or inoperative position and returned, it first causes a tightening slide to be displaced relatively to the hoop held by the hoop locking pawl and the said slide to be returned together with the hoop held thereon by the tightening pawl. As soon as the device has been returned over the cramping sleeve together with the tightened hoop after the tightening operation, the operating lever actuates when moved beyond 180° a cutting device to sever the hoop extension.

An embodiment of the present invention is described in detail by way of example in conjunction with Figs. 1–5 in which.

Figure 1:
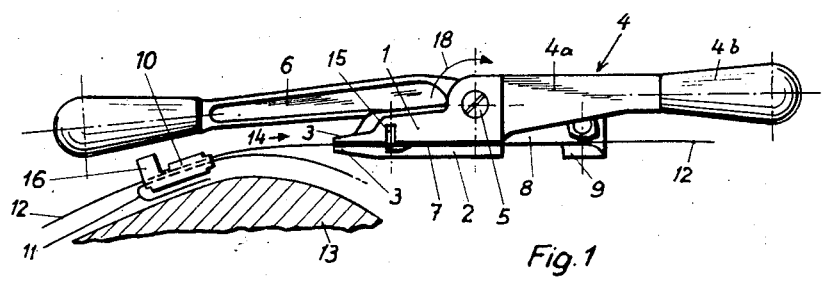
Figs. 1 and 2 are reduced side elevational and top plan views, respectively, of the device according to the present invention in idle or inoperative position.
Figure 2:
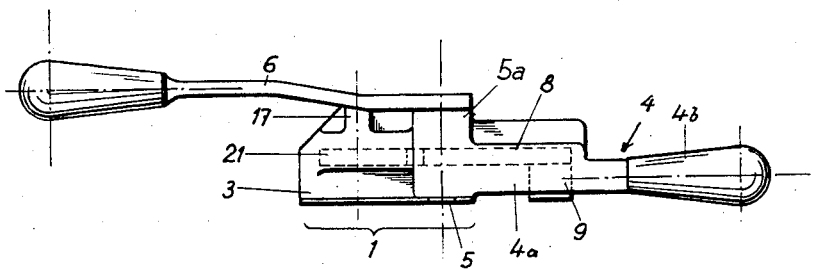

The hoop tightening and cutting device according to this invention is illustrated in Figs. 1 and 2 which has the substantially flat and elongated tightening frame 1 with a detachable base plate 2 and the rhamphoid front portion 3. The tightening frame proper 1 comprises the handle 4 the front portion 4a of which is U-shaped in cross-section and open at the bottom. The tightening frame 1 accommodates the operating shaft 5 fixedly and operatively connected to the operating lever 6. The frame 1 further comprises a flat hoop channel 7 open at the side which extends over the entire tightening frame 1 along the side opposite the operating lever 6 and which is closed underneath by the base plate 2. From the tightening frame 1 there extends to the rear a tightening slide 8 comprising a key or rack 20 sliding in groove 2 and the tightening shoe 9 which is moved into and out of the tightening frame by actuation of the operating lever 6 in a manner to be described below.

Figs. 1 and 2 show the device in idle or inoperative position in which the operating lever 6 always extends in a direction opposite that of the handle 4. This lever and handle are of balanced weight so that the device enables the hoop to be easily inserted in the hoop channel 7 by one hand of the operator.

Figure 4:
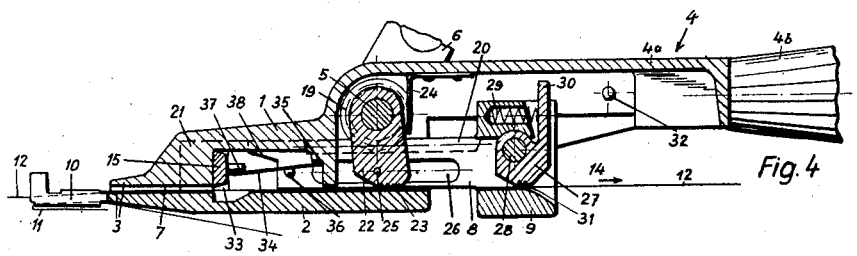
Figure 5:
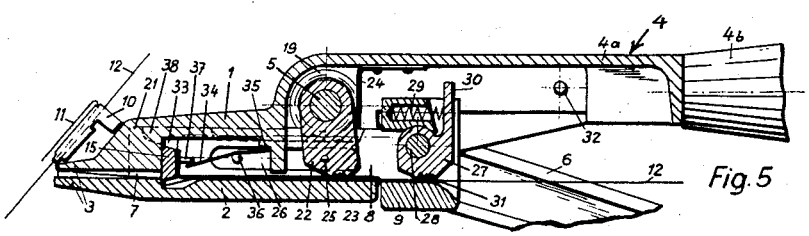

The tightening and cutting operation of the device according to this invention is effected in known manner by means of a clamping sleeve 10 which is attached to one end 11 of the hoop 12 by bending the latter. To tighten the hoop 12 around the object 13 to be provided with the hoop, the said hoop is moved relatively to the clamping sleeve 10 in the direction of arrow 14 (Figs. 1 and 4). This movement is effected by the tightening frame which rests its rhamphoid front end 3 against the clamping sleeve 10. Similtaneously the tightening slide 8 is reciprocated by the operating lever 6 in a manner to be described later, and the said slide pulls the hoop 12 through the hoop channel 7. On completion of the tightening operation, hoop tension forces the rhamphoid front end 3 of the tightening frame against the front edges of the clamping sleeve 10. The operating lever 6 is then positioned parallel to the handle 4 and the entire device thrown rearward in counter-clockwise direction on the clamping sleeve 10 until the top face of the flat tightening frame 1 engages the clamping sleeve 10 so that the hoop end in the hoop channel 7 is bent over at the front edge of the clamping sleeve 10 (Fig. 5). When the device is in this position, the operating lever 6 is moved backwards in clockwise direction relative to the handle 4 held in the left hand, thereby actuating the cutting member 15 in the tightening frame 1 and cutting the hoop in the said frame. The device can then be removed; the hoop end pointing to the rear over the clamping sleeve is depressed on the said sleeve and attached therein by bending over tongues 16 thus completing the hooping operation on object 13.

Figure 3:
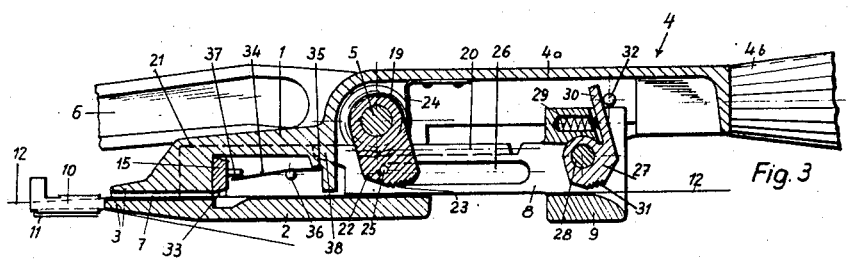
Figs. 3 to 5 are approximately full-size longitudinal sectional views of the device according to Figs. 1, 2 in idle, starting position, in a median position, and in cutting position respectively.

Figs. 3 to 5 show an embodiment of the tightening and cutting device according to the present invention in longitudinal section. In Fig. 3 the device is shown in idle position, in Fig. 4 with the tightening operation in progress and in Fig. 5 after completion of the cutting operation.

As shown in Figs. 3–5 the flat, approximately rectangular tightening frame 1 and the rear U-shaped portion 4a of the handle 4 form an integral casting having a sturdy bearing or journal 5a for the operating shaft 5 which projects from one side of the tightening frame 1 therebeyond to accommodate the operating lever 6. This operating lever 6 rests on a stop 17 on the frame 1 when in idle position (Figs. 1, 2, 3) and can be swivelled in the direction of arrow 18 (Fig. 1) beyond 180° until it reaches the position illustrated in Fig. 5. On every rotation of the operating lever 6 a pinion or gear 19 fixedly arranged on the operating shaft 5 is rotated and this gear meshes with the upper edge of the sliding key which is formed as a rack 20 in the tightening slide 8.

The tightening slide 8 with the tightening shoe 9 is rectangular in section and can reciprocate in a suitable groove 21 in the tightening frame 1. This groove 21 (Fig. 2) is arranged parallel to the hoop channel 7 along its inner longitudinal edge and is closed below by the removable base plate 2 so that the tightening slide 8 is guided on all sides. The tightening shoe 9 which is provided at the rear end of the tightening slide 8 projects laterally from the tightening slide 8 (Fig. 2) approximately to the edge of the hoop channel 7, and the tightening frame 1 and the base plate 2 respectively, and engages below hoop 12 in the hoop channel 7 (Fig. 3). The upper surface of the shoe 9 facing the hoop 12 is approximately at the same level as the inside of the base plate 2 forming the lower boundary of the hoop channel 7.

The operating shaft 6 further serves as pivot for a hoop locking pawl 22 of which the milled or serrated face 23 is formed so as to press at a steep angle against the inside of the base plate 2 and the hoop 12 there inserted respectively (Figs. 4, 5) under the action of the leaf spring 24 when in operative position. This locking pawl 22 is swivelled up against the action of spring 24 in order to facilitate insertion of the hoop 12 in the hoop channel 7 when the device is in inoperative position so that the hoop channel 7 is unobstructed as shown in Fig. 3. This action is effected by a pin 25 arranged on the hoop locking pawl 22 which projects rearwardly into a groove or slot 26 provided in the side face of the tightening slide 8 and having a length enabling the pin 25 and the hoop locking pawl 22 to be rotated and raised in counter-clockwise direction to an inoperative position when the tightening slide 8 is in the terminal position shown in Fig. 3, but to remain unaffected by the said groove or slot 26 in all other positions of the tightening slide 8. Whenever the milled face 23 of the hoop locking pawl 22 engages the surface of the hoop 12, any movement of the said hoop opposite the direction of arrow 14 is prevented by the jamming of the pawl 22 while the hoop is free to move in the direction of arrow 14.

A hoop tightening pawl 27 operating in similar manner is provided on the pivot 28 and its milled face 31 is forced at a steep angle against the inside of tightening shoe 9 and the hoop 12 inserted there respectively by the pawl lever 30 under the action of the helical spring 29. When the tightening slide 8 is in inoperative position, the pawl lever 30 engages a stop pin 32 provided on the inside of the U-shaped portion 4a of the handle 4 so that the hoop tightening pawl 27 is rotated around pivot 28 in counter-clockwise direction and raised with its face 31 thus leaving the hoop channel 7 unobstructed for free insertion of the hoop 12. As soon as the milled or serrated face 31 of the hoop tightening pawl 27 engages the upper face of hoop 12, the tightening shoe 9 together with pawl 27 can be slid in one direction and inserted in the stationary tightening frame 1 while the hoop 12 remains stationary, but when the said tightening shoe 9 is moved in the other direction away from tightening frame 1 the hoop 12 binds under the hoop tightening pawl 27 and is displaced by the tightening shoe 9.

Co-operation of the hoop locking pawl 22 and the hoop tightening pawl 27 enables the hoops 12 to be tightened in steps, the rhamphoid front portion 3 of the tightening frame 1 resting against the front edge of the clamping sleeve 10. The operating lever 6 is first in inoperative position after insertion of the hoop 12 in the hoop channel 7, thereafter said lever 6 is moved in the direction of arrow 18 (Fig. 1) so that the tightening slide 8 with tightening shoe 9 are moved into the tightening frame 1 with the hoop locking pawl 22 holding the hoop 12 in position while the hoop tightening pawl 27 glides across hoop 12. After performance of a swivelling movement of the operating lever 6 to approximately 180°, i.e. into approximately parallel relation to handle 4, it is returned and the hoop tightening pawl 27 together with the tightening shoe holds and carries the hoop along through the hoop channel 7 and below the hoop locking pawl 22 and out of the tightening frame 1. This return movement of the operating lever 6 is not, however, continued to its idle position in order to prevent the two pawls 22 and 27 from being undesirably raised, but terminated previously thereto, while the forward and return movement of lever 6 is continuously performed until the hoop 12 has assumed the desired tension relative to the clamping sleeve 10, which tension can be recognized by the resistance of the operating lever 6 against further tightening.

After completion of the tightening operation the operating lever 6 is positioned in parallel relation to the handle 4 and the entire device is thrown back over the clamping sleeve 10 in the manner described above so that it assumes the position relative to the said sleeve 10 shown in Fig. 5 (the clamping sleeve 10 actually remaining in the position shown in Figs. 3 and 4 and the device in slanting position) in which the cutting operation is performed.

The hoop 12 inserted in hoop channel 7 is cut by a chisel-type knife 15 in the tightening frame 1, which can be raised and lowered in a transverse slot 33 vertical to the hoop channel 7. To this end, it is hinged on a pivot on the side of the tightening frame 1 facing the operating lever 6. The knife 15 is held by a preloaded leaf spring 34 placed between the transverse rib 35 and the pin 36 of the tightening frame 1 and engaging a projection 37 of the knife 15. The upper edge of the knife 15 is chamfered in the direction of the tightening slide 8 which in turn is provided with a nose 38 having an inverted chamfer, and these two oblique faces, i.e. on the knife 15 and nose 38, are adapted to co-operate. If the operating lever 6 is moved beyond 180° into the position shown in Fig. 5, the tightening slide 8 is slid into its groove 21 by the gear 19 and its associated rack 20 to such an extent that the nose 38 engages the oblique face of the knife 15, depressing it against the action of leaf spring 34 on further movement of the tightening slide 8 so that the hoop 12 is severed. When the operating lever is returned into parallel relation to the handle 4 and then into idle position on stop 17, the knife 15 is first returned into inoperative position by the leaf spring 34, then the two pawls 22 and 27 are removed from the hoop channel 7 so that the hoop 12 held in the rear portion of the tightening frame 1 can slip out of the hoop channel 7 laterally while the device is removed from the hoop end held in its rhamphoid front portion.

The hoop tightening and cutting device disclosed facilitates hooping of objects of any exterior shape and is equally suitable to handle narrow and wide hoops. An important advantage resides in the fact that the tightening frame 1, 2 can be held by a stationary handle 4 while the tightening and cutting operations can be effected by means of a single operating lever 6. A further advantage is that the device is of flat design since the entire device can be thrown back to almost 180° around the clamping sleeve when the handle 4 and operating lever 6 are parallel after the tightening operation, so that the hoop end projecting beyond the clamping sleeve after the cutting operation and removal of the device can be sharply bent over at the front end of the said sleeve, which largely prevents opening of the hoop even when very highly tightened. The direction of movement of the operating lever 6 further considerably facilitates work with the device during the cutting operation, since returning of the operating lever 6 relatively to the handle 4 in the thrown-back device is easy and can be effected with substantial power without being obstructed by the object to be hooped. Finally, the simple design of the device, which consists of only a few parts, is important since it enables it to be manufactured simply.

The design of the tightening and cutting device according to the present invention has been illustrated and described in one embodiment only in conjunction with Figs. 1–5. The individual functions of the operating lever may, of course, be performed in another manner. By way of example, it is possible to feed the hoop in the tightening operation by means of a friction wheel having a milled surface and to actuate the said wheel by means of a ratchet. Raising of the hoop locking pawl and the hoop tightening pawl can be effected to another manner by the operating lever in inoperative position and the rectangular sliding key or slide may be replaced by other suitable structural members of known design. Finally any other cutting device having sufficient power can be employed on the hoop and it may be coupled with the swivel movement of the operating lever beyond 180° in different manner.

Having now particularly described and ascertained the nature of said invention and the manner in which the same is to be performed, we declare that what we claim is:

1. An apparatus for tightening and cutting hoop irons in band and like form around an object; comprising a substantially flat elongated hollow frame of inverted U-shaped cross-section, a base plate detachably fixed to the bottom of one wall of said frame so as to form an open sided guide channel for said hoop irons therebetween, said frame and said base plate converging together at one end of each into a rhamphoid and forward front portion, said frame forming a handle at the other and rearward end thereof, an operating shaft transversely and rotatably journalled in said frame intermediate said ends thereof, an operating lever fixedly connected to said shaft for rotation of the latter, pinion means fixedly arranged on said shaft for rotation therewith, a slide arranged with respect to said elongated frame for axial movement while being laterally and vertically retained therein, said slide having a longitudinal slot positioned therein and a forward chamfered end and being provided with a rack engaging said pinion for effectuating the axial movement of said slide, a tightening shoe fixedly attached to and projecting laterally from the bottom of said slide and below said guide channel for said hoop irons, first pawl means arranged for pivoting about said shaft and having a serrated lower face capable of forming a steep angle with said base plate for locking said hoop irons thereagainst, biasing means for urging said first pawl means against said base plate, a first pin fixedly attached to and laterally projecting from said first pawl means into said slot in said slide for rotating said first pawl about said shaft into a position where said serrated lower face of said first pawl means will be spaced from said base plate when said slide is in a rearward terminal position, second pawl means rotatably positioned on said slide above and biased against said tightening shoe for contacting cooperation of a lower face of said second pawl with said tightening shoe, stop means fixedly attached within said frame for contacting and rotating said second pawl means to raise said lower face of same from said tightening shoe when said slide is in said rearward terminal position, cutting means including a knife having a chamfered upper edge, said knife being adapted for vertical guided movement within said frame and for downward actuation through said hoop irons in said guide channel by means of said forward chamfered end of said slide moving against said chamfered edge of said knife when said slide is moved to a forward terminal position.

2. A device for tightening and cutting a band, hoop iron and like strap for securing same around an object; comprising a substantially flat, elongated and hollow frame terminating at one end in a stationary gripping handle, an operating shaft rotatably journalled within and traversing said frame adjacent an opposite end thereof, an operating lever fixedly connected to said shaft for rotating the latter and positioned without said frame and normally extending in a direction opposite to that of said handle, slide means guided lengthwise of and within said frame, means connecting said shaft to said slide means for translating rotary motion of the former to longitudinal motion of the latter, an elongated base plate connected to said frame and spaced therefrom to form a substantially horizontal channel for said strap when received therein, a knife element supported within said frame and displaceable substantially perpendicular to said channel against said base plate, a portion on said slide means being engageable with said knife element to displace the same toward said base plate in predetermined end position of said slide means, a tightening shoe carried by said slide means and supporting said strap when received in and passed through said channel, and respective swingably disposed spaced apart strap engageable pawls arranged opposite said base plate and said tightening shoe, one of said pawls being pivotally mounted in said frame, the other pawl being pivoted to said slide means, said one strap engageable pawl being a holding pawl while said other pawl is a tensioning pawl, both of said pawls being operable upon longitudinal motion of said slide means through actuation of said operating lever relative to said handle, whereby said strap within said channel and extending therefrom above said tightening shoe will be tensioned step by step by relative swinging movement of said engageable pawls against said strap, said operating lever when swung to cause said predetermined end position of said slide means causing actuation of said knife element thereby to cut off said strap ahead of said strap engageable pawls.

3. A device according to claim 2, said slide means being provided with a slot and with a pivot, said holding pawl being mounted on said shaft and being provided with an abutment pin movable within said slot of said slide means to be engaged by the latter when said slide means is moved to said other predetermined position, said slide means being further provided with a nose extension for engaging said knife means to actuate the latter when said operating lever takes up a position beyond 180° with respect to its position of rest, said tensioning pawl being connected to said pivot, one face of said tensioning pawl being biased against said tightening shoe, and means mounted on said frame and in the path of said slide means and coacting with said tensioning pawl to raise said face thereof from said tightening shoe when said lever is in the position of rest.

4. A device according to claim 2, said holding pawl being connected to said shaft, said tensioning pawl being pivotally supported on said slide means and disposed for coaction with said tightening shoe.

5. A device according to claim 4, said tensioning pawl having an extension, spring means abutting said extension for swivelling said tensioning pawl in the direction of said tightening shoe, and abutment means on said frame and in the path of said extension, whereby the latter when said slide means is moved within said frame engages said abutment thereby spacing said tensioning pawl from said tightening shoe.

References Cited in the file of this patent

UNITED STATES PATENTS

| 1,665,323 | Payne | Apr. 10, 1928 |
| 1,885,742 | MacChesney et al. | Nov. 1, 1932 |
| 2,075,720 | Hoffman | Mar. 30, 1937 |
| 2,199,744 | Gerrard | May 7, 1940 |
| 2,368,969 | Cleveland | Feb. 6, 1945 |
| 2,612,804 | Craig | Oct. 7, 1952 |
| 2,643,687 | Schlage et al. | June 30, 1953 |
| 2,779,566 | Keeble | Jan. 29, 1957 |
| 2,797,714 | MacChesney | July 2, 1957 |

FOREIGN PATENTS

| 838,751 | France | Mar. 15, 1939 |